United States Patent
Ho

(10) Patent No.: US 6,321,288 B1
(45) Date of Patent: Nov. 20, 2001

(54) SERIAL IRQ SLAVE CONTROLLER WITH AUTO-SYNCHRONIZATION

(75) Inventor: Franklin Sai-Wai Ho, San Carlos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/238,199

(22) Filed: Jan. 26, 1999

(51) Int. Cl.$^7$ ........................................... G06F 9/46
(52) U.S. Cl. ............................... 710/260; 710/48
(58) Field of Search ................... 710/260, 266, 710/110, 48

(56) References Cited

U.S. PATENT DOCUMENTS

| | | | |
|---|---|---|---|
| 5,506,965 | 4/1996 | Naoe . | |
| 5,671,421 | * 9/1997 | Kardach et al. | 710/260 |
| 5,684,803 | 11/1997 | Thuy | 370/451 |
| 5,710,755 | 1/1998 | Chen | 370/24 |
| 5,737,630 | 4/1998 | Kobayashi . | |
| 5,758,098 | 5/1998 | Townsley et al. | 710/102 |
| 5,768,543 | 6/1998 | Hiles | 710/107 |
| 5,943,500 | * 8/1999 | Maguire et al. | 710/260 |
| 5,951,669 | * 9/1999 | Bailey et al. | 710/260 |

OTHER PUBLICATIONS

"Serialized IRQ Support for PCI Systems" Compaq Computer Corporation et al., Revision 6.0, Sep. 1, 1995.

* cited by examiner

*Primary Examiner*—Glenn A. Auve
(74) *Attorney, Agent, or Firm*—Stallman & Pollock LLP

(57) ABSTRACT

Automatic synchronization occurs between a master interrupt controller and a slave interrupt controller. A first state machine counts the number of continuous low bits on a serial data line, and reports this count to a second state machine. The second state machine, employs an intermediate TRANSITION state. While the slave is in the IDLE state (as indicated by the second STATE machine), a low on the serial data line for one cycle causes the second state machine to go into the TRANSITION state. In the TRANSITION state, the second state machine employs the count value generated by the first state machine. If the count value indicates less than four cycles, then there is considered to have been a STOP frame or serial IRQ data, and the second state machine goes back into the IDLE state. Alternately, if the count value indicates four or more cycles, then there is considered to have been a START frame and the second state machine goes into the shift IRQ state. Furthermore, after reaching the shift IRQ state, if the second state machine receives a count value of two from the first state machine, the second state machine goes into the TRANSITION state. From the TRANSITION state, if the second state machine receives a count value of two or three from the first state machine (indicating two or three low cycles—a STOP frame), the second state machine moves into the IDLE state. By contrast, if the second state machine receives a count value of four or more from the first state machine (indicating four or more low cycles—a START frame), the second state machine moves into the shift IRQ state.

8 Claims, 3 Drawing Sheets

SERIAL IRQ SLAVE CONTROLLER WITH AUTO-SYNCHRONIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to serial slave interrupt controllers and, in particular, to a serial slave interrupt controller that has an auto-synchronization feature such that a master and slave, once unsynchronized, are quickly and reliably re-synchronized.

BACKGROUND

It is well-known to operate interrupt controllers (e.g., in a personal computer system) in a master-slave fashion. A specification for doing so has been adopted by a consortium of companies, including the assignee of the present invention, National Semiconductor Corporation. That specification is entitled "Serialized IRQ Support for PCI Systems" (revision 6.0; Sep. 1, 1995) and is hereby incorporated by reference in its entirety.

In accordance with the Specification, an interrupt request may be received at a slave controller, and the request is then communicated as an "IRQ value" to a host (also sometimes called"master") controller. (The controllers may also have their send data lines wired together, as shown in FIG. 4.1 of the Specification.) Communication of IRQ values from a slave controller to the host controller is serialized. That is, communication is over a single line. IRQ value messages are bracketed by start and stop frames, which are signified by predetermined periods of low signal on the serial line. For example, when the serial communication is initially in an idle state, a START frame may be indicated by four to eight clock cycles of the signal on the line being low and then a transition to high. The first low cycle in a START frame would generally be generated by either the slave (quiet mode) or master (continuous mode), and the remaining low cycles in the START frame are generated by the master.

The data portion of the message consists of a series of low and high signals to indicate, for example, a particular IRQ value. Specifically, during a series of cycles of transmission of the data portion, the line may be either low for a particular cycle or stay high for that cycle.

Finally, a STOP frame is generated by the master, and is indicated by two to three cycles of the wire being low. A STOP frame indicates that, at the next cycle, the master will be in IDLE mode again.

So, for example, referring to FIG. 1, if the slave is in IDLE mode at point A, a down edge at point B followed by an up edge at point C will cause the slave to go to "SHIFT_IRQ" (DATA TRANSFER) mode. Finally, after the proper number of data bits have been transmitted, a down edge at point D followed by an up edge at point E will cause the slave to go back to IDLE mode.

A significant disadvantage of these prior art implementations, however, is that they assume the master and slave are always synchronized to each other. If the master and slave fall out of synchronization, it is difficult if not impossible to resynchronize them. FIG. 2 shows an example of the slave controller being in IDLE mode at point R, when a down edge at point S followed by an up edge at point T causes the slave controller to go into the data transfer mode. This is even though the down edge at point S followed by the up edge at point T constitutes a STOP frame, and not a START frame. Furthermore, the START frame constituted by the down edge at point U followed by the up edge at point V causes the slave to go into an IDLE mode, rather than into DATA TRANSFER mode, as desired.

FIG. 3 illustrates a situation where the slave controller is in a DATA TRANSFER mode (at point X) when it receives a start pulse. The slave controller interprets the down edge at point Y followed by the up edge at point Z as a STOP pulse, even though the Y-Z pulse is intended by the master controller as a START pulse. Therefore, the slave controller goes into IDLE mode, rather than into DATA TRANSFER mode as intended.

As yet another example, FIG. 4 illustrates a situation where at point d the slave controller is in DATA TRANSFER mode. The STOP pulse, constituted by the down edge at point e followed by the up edge at point f, is ignored by the slave controller because it comes earlier than expected (as indicated by a data frame count or transfer time limit). Thereafter, the master controller and the slave controller are hopelessly out of synchronization with each other as can be seen from the examples of FIGS. 2 and 3.

SUMMARY

The present invention provides for automatic synchronization between the master and the slave. A first state machine is provided that counts the number of continuous low bits on a serial data line, and reports this count to a second state machine. The second state machine, employs an intermediate TRANSITION state. While the slave is in the IDLE state (as indicated by the second STATE machine), a low on the serial data line for one cycle causes the second state machine to go into the TRANSITION state.

In the TRANSITION state, the second state machine employs the count value generated by the first state machine. If the count value indicates two or three, then there is considered to have been a STOP frame, and the second state machine goes back into the IDLE state. Alternately, if the count value indicates four or more cycles, then there is considered to have been a START frame and the second state machine goes into the shift IRQ state. If the count value indicates one cycle, then this indicates IRQ data being transferred and also that the slave controller is out of synch, and the first state machine goes back into the IDLE state.

DETAILED DESCRIPTION

Figure 5:
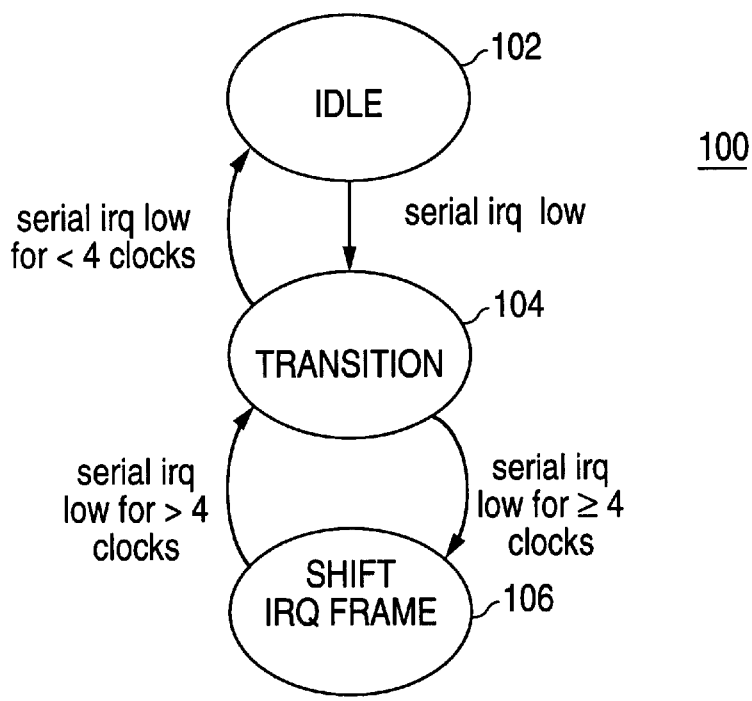
FIG. 5 illustrates an embodiment of a main state machine in accordance with the present invention.
Figure 6:
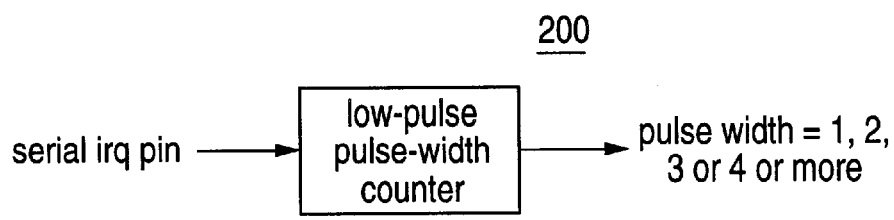
FIG. 6 illustrates an embodiment of a secondary state machine in accordance with the present invention.

FIG. 5 shows a "main" state machine 100 (also referred to as a "second" state machine), and FIG. 6 shows a "secondary" state machine 200 (also referred to as a "first" state machine). The main state machine 100 and the secondary state machine 200 cooperate to not only handle a START, DATA TRANSFER and STOP sequence, but also to handle resynchronization of the slave with the master should the slave and master become out of synchronization.

The main state machine 100 defines three operating states: idle 102, transition 104 and shift 106. The operation of these state machines are now discussed with reference to the timing diagrams of FIG. 1 and FIGS. 7 through 9 to illustrate its operation.

Figure 1:
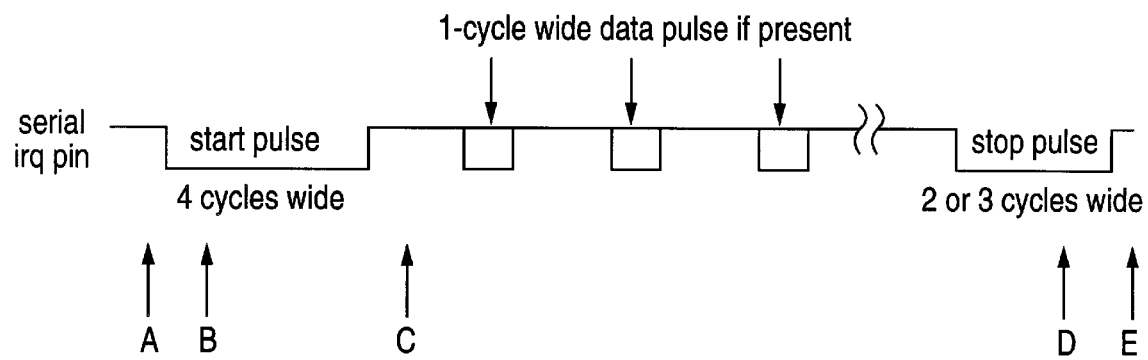
FIG. 1 is a timing diagram illustrating normal synchronized communication between a master interrupt controller and a slave interrupt controller.

FIG. 1 illustrates the normal synchronized operation of the slave. That is, FIG. 1 illustrates a situation where the slave is synchronized to the master. Referring to FIG. 1 and FIGS. 5 and 6, at point A in FIG. 1, the main state machine 102 is in IDLE mode 102. At the falling edge on the signal line, designated by point B in FIG. 1, the main state machine 100 goes to the transition state 104.

During the transition state 104, the secondary state machine 200 operates to determine a number of clock cycles during which the signal on the line remains low. The result of this determination is provided back to the transition state 104 of the main state machine 100 when the signal goes high.

Referring specifically to FIG. 1, where the signal on the line goes high at point C, and the secondary state machine 200 determined that the signal line had remained low for four or more cycles. This result (four or more cycles) is passed back to the main state machine 100 and, given the result, the main state machine 100 moves from the transition state 104 to the shift state 106. During the shift state 106, the slave circuitry shifts one or more IRQ values onto the serial line.

Then, referring again specifically to FIG. 1, where the signal on the line goes low again at point D for two consecutive cycles, the main state machine 100 moves from the shift state 106 to the transition state 104. When the signal line goes high again at point E, the low-pulse pulse-width count (as determined by the secondary state machine 200) provides a determination that the signal on the line had remained low for two or three cycles. Given that determination, the main state machine 100 moves from the transition state 104 back to the idle state 102.

Figure 2:
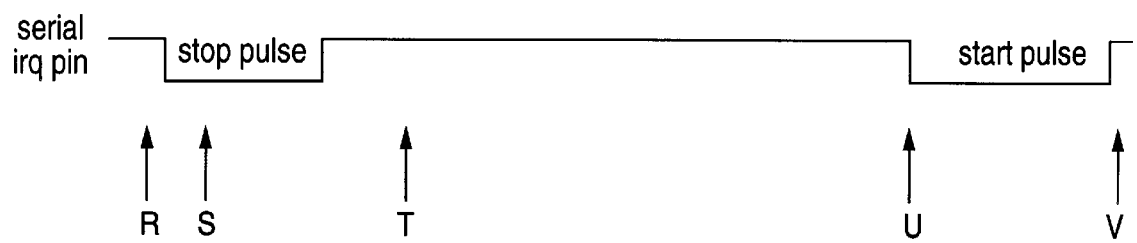
FIG. 2 is a timing diagram illustrating the operation of a prior art slave interrupt controller communicating with a master interrupt controller, receiving a STOP pulse while the prior art slave interrupt controller is in IDLE mode.
Figure 3:
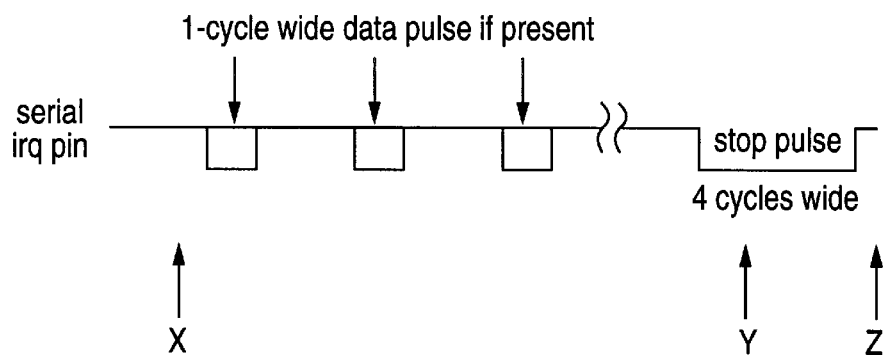
FIG. 3 is a timing diagram illustrating the operation of a prior art slave interrupt controller communicating with a master interrupt controller, receiving a START pulse while the prior art slave interrupt controller is in a DATA TRANSFER mode.
Figure 4:
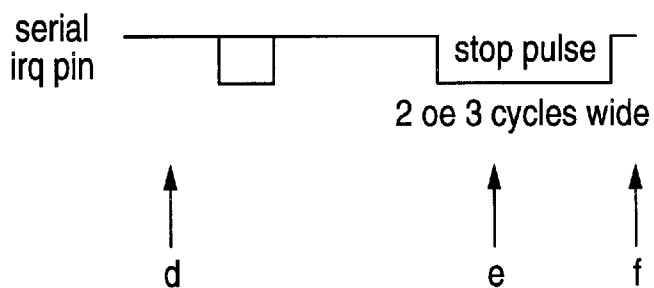
FIG. 4 is a timing diagram illustrating the operation of a prior art slave interrupt controller communicating with a master interrupt controller, receiving a STOP pulse while the prior art slave interrupt controller is in a DATA TRANSFER mode, but earlier than a normal STOP pulse was expected.
Figure 7:
FIG. 7 illustrates how a slave controller having the combination of main state machine of FIG. 5 and the secondary state machine of FIG. 6 handles the situation of FIG. 2.
Figure 8:
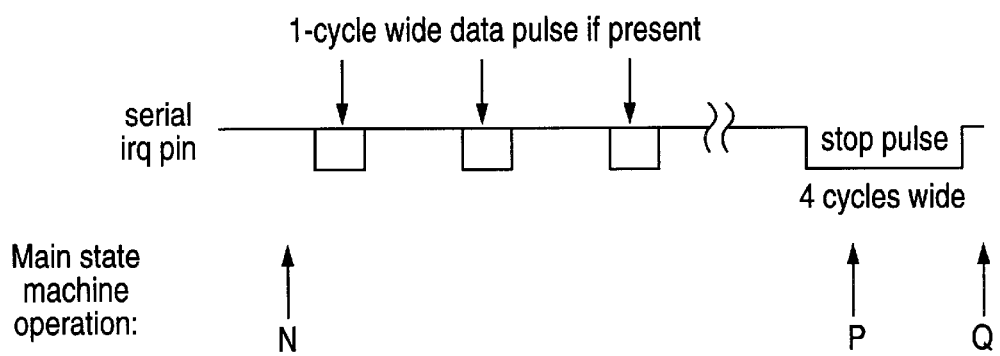
FIG. 8 illustrates how a slave controller having the combination of main state machine of FIG. 5 and the secondary state machine of FIG. 6 handles the situation of FIG. 3.
Figure 9:
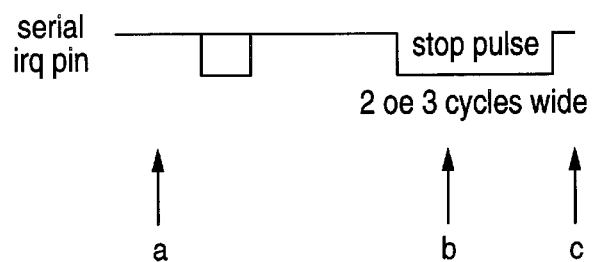
FIG. 9 illustrates how a slave controller having the combination of main state machine of FIG. 5 and the secondary state machine of FIG. 6 handles the situation of FIG. 4.

FIGS. 7 to 9 are timing diagrams that illustrate how the slave can reliably resynchronize to the master. The timing diagrams of FIGS. 7 to 9 correspond to the timing diagrams of FIGS. 2 to 4 discussed in the Background.

Referring to FIG. 7, this timing diagram illustrates a situation where the master and slave are out of synchronization so that the main state machine 100 is in the idle state 102 when a STOP pulse occurs. At point I, the main state machine 100 is in the idle state 102. At point J, there is a transition to the signal line being low and the main state machine 100 goes from the idle state 102 to the transition state 104. At point K, the signal line goes high again and the secondary state machine 200 provides a determination that the signal on the line had remained low for two or three cycles (i.e., was a STOP pulse). Based on that determination, the main state machine goes from the transition state 104 back to the idle state 102. This is rather than going, improperly, from the transition state 104 to the shift state 106. Then, when the START pulse is put on the line at point L, the main state machine 100 moves from the idle state 102 into the transition state 104. Then, at point M, the secondary state machine 200 provides a determination that the signal on the line had remained low for at least four cycles (i.e., was a START pulse). Based on that determination, the main state machine goes from the transition state 104 to the shift state 106.

Referring to FIG. 8, this timing diagram illustrates a situation where the master and slave are out of synchronization so that the main state machine 100 is in the shift state 104 when a start pulse occurs. At point N, the main state machine 100 is in the shift state 106. Then, when the START pulse is put on the line at point P (or, more precisely, when the serial line goes low for two consecutive cycles) the main state machine 100 moves from the shift state 106 into the transition state 104. Then, at point Q, the secondary state machine 200 provides a determination that the signal on the line had remained low for at least four cycles (i.e., was a START pulse). Based on that determination, the main state machine goes from the transition state 104 back to the shift state 106.

Finally, referring to FIG. 9, this timing diagram illustrates a situation where the master and slave are out of synchronization so that the main state machine 100 is in the shift state 106 when a stop pulse comes earlier than expected. At point a, the main state machine is in the shift state 106. Then, when the STOP pulse is put on the line (for two or more consecutive cycles) at point b, the main state machine 100 moves from the shift state 106 into the transition state 104. Then, at point c, the secondary state machine 200 provides a determination that the signal on the line had remained low for two or three cycles (i.e., was a STOP pulse). Based on that determination, the main state machine goes from the transition state 104 to the idle state 102.

Thus, it can be seen that the slave controller operating with the main state machine 100 and the secondary state machine 200 can simply and reliably resynchronize to a master controller with which it is out of synchronization.

It should be understood that various alternatives to the embodiments of the invention described herein may be employed in practicing the invention. It is intended that the following claims define the scope of the invention and that methods and apparatus within the scope of these claims and their equivalents be covered thereby.

It should also be understood that the diagrams have been chosen to highlight the features of the invention. In a commercial embodiment, the main state machine 100 actually has two shift states instead of one; one to shift a 1 out, and the other to shift a 0 out, so during the data shift period, it would be going between these two states depending on whether a 0 or a 1 is shifted out. Also there are other counters (or state machines) to keep track of which of the interrupt signals have been progressed to, and which clock cycle for a particular interrupt (3 clock cycles for each interrupt).

What is claimed is:

1. A slave interrupt controller for communication of interrupt information via a serial line, comprising:

(a) interrupt information providing circuitry that communicates interrupt information from the slave interrupt controller on the serial line, the communication being preceded by a start indication and followed by a stop indication, the interrupt information based on an event external to the slave interrupt controller;

(b) state machine circuitry that controls the interrupt information providing circuitry, the state machine circuitry including:

(i) main state machine circuitry that, at any one time, operates in one of:

an idle state during which the interrupt information providing circuitry is controlled to not communicate interrupt information on the serial line;

a data transfer state during which the interrupt information providing circuitry is controlled to communicate interrupt information on the serial line; and a transition state between the idle state and the data transfer state, movement into the transition state from the idle state and the data transfer state being based on detection of an indication of a possible start indication or stop indication; and (ii) secondary state machine circuitry operable at least during the transition state of the main state machine to detect whether the possible start indication or stop indication is one of an actual start indication or stop indication and to generate a result of the detection; and wherein, in the transition state, the main state machine circuitry determines to which of the idle state and the data transfer state to move the main state machine circuitry in response to the detection result from the secondary state machine circuitry.

2. The slave interrupt controller of claim 1, and further comprising:

event detection circuitry to detect the event external to the slave interrupt controller;

interrupt information generating circuitry to generate the interrupt information based on the detected event.

3. The slave controller of claim 2, and wherein:

the slave interrupt controller operates responsive to cycles of a clock, and the secondary state machine performs the detection by counting a number of cycles of the clock that the serial line is "low", generating the result of the detection is "start" if the count is greater than or equal to four and generating the result of the detection is stop if the count is two or three.

4. The slave controller of claim 3, and wherein the possible start indication upon which the main state machine moves into the transition state from the idle state is a low pulse on the signal line and the possible stop indication upon which the main state machine moves into the transition state from the data transfer state is a low pulse on the signal line for greater than one cycle of the clock.

5. The slave interrupt controller of claim 1, and wherein:

the slave interrupt controller operates responsive to cycles of a clock, and the secondary state machine circuitry performs the detection by counting a number of cycles of the clock that the signal on the serial line has a first particular condition.

6. The slave interrupt controller of claim 5, and wherein the first particular condition is "low".

7. The slave controller of claim 1, and wherein the possible start indication upon which the main state machine moves into the transition state from the idle state is a low pulse on the signal line.

8. The slave controller of claim 7, and wherein the possible stop indication upon which the main state machine moves into the transition state from the data transfer state is a low pulse on the signal line for greater than one cycle of the clock.

\* \* \* \* \*